(12) United States Patent
De Lucia

(10) Patent No.: US 6,792,780 B1
(45) Date of Patent: Sep. 21, 2004

(54) UNIVERSAL PORTABLE BRAKE PEDAL LOCKING DEVICE FOR VEHICLES

(76) Inventor: Achille A. De Lucia, 1565-81 St., Brooklyn, NY (US) 11228

( * ) Notice: Subject to any disclaimer, the term of this patent is extended or adjusted under 35 U.S.C. 154(b) by 7 days.

(21) Appl. No.: 10/417,777

(22) Filed: Apr. 15, 2003

Related U.S. Application Data

(60) Provisional application No. 60/391,017, filed on Jun. 25, 2002.

(51) Int. Cl.[7] .............................................. B60R 25/02
(52) U.S. Cl. ........................................ 70/202; 70/237
(58) Field of Search .......................... 70/198–203, 237, 70/238, 254

(56) References Cited

U.S. PATENT DOCUMENTS

| | | | | |
|---|---|---|---|---|
| 5,267,458 A | | 12/1993 | Heh ............................. 20/238 |
| 5,282,373 A | * | 2/1994 | Riccitelli ..................... 70/199 |
| 5,537,846 A | | 7/1996 | Simon ......................... 70/202 |
| 5,715,710 A | | 2/1998 | De Lucia et al. ............. 70/202 |
| 5,870,912 A | | 2/1999 | Vito ............................. 70/202 |
| 5,906,121 A | * | 5/1999 | Mankarious .................. 70/199 |
| 5,911,391 A | * | 6/1999 | Russ et al. ................... 244/224 |
| 5,911,765 A | * | 6/1999 | DaSilva ....................... 70/202 |
| 5,979,197 A | * | 11/1999 | Mellini et al. ................ 70/199 |
| 6,006,559 A | * | 12/1999 | Hsu ............................. 70/202 |
| 6,439,012 B1 | * | 8/2002 | Chen ............................ 70/202 |
| 6,463,772 B2 | * | 10/2002 | Vito ............................. 70/207 |
| 6,575,001 B1 | * | 6/2003 | Simon et al. ................. 70/202 |
| 6,575,002 B1 | * | 6/2003 | Hsu ............................. 70/202 |
| 6,662,894 B2 | * | 12/2003 | Chantrasuwan et al. .... 180/287 |
| 2001/0002543 A1 | * | 6/2001 | Vito ............................. 70/202 |
| 2001/0005997 A1 | * | 7/2001 | Vito ............................. 70/202 |

OTHER PUBLICATIONS

Advertisement April 2000 for Unbreakable Autolock Pro (Skolon in 5870912) By Lawman Armor Corp.

* cited by examiner

*Primary Examiner*—Lloyd A. Gall
(74) *Attorney, Agent, or Firm*—Robert W.J. Usher

(57) ABSTRACT

A portable universal anti-theft device for immobilizing a brake pedal of a motor vehicle having first, second and third shafts assembled in telescopic relation with an end of the first shaft providing a stand-off for engaging a vehicle body and the second and third shafts having, respectively, upper and lower clamping jaws extending transversely therefrom. One clamping jaw comprises a hook and another clamping jaw comprising a wedge so that relative axial movement of the second and third shafts together brings the jaws together about a brake pedal therebetween with the wedge member urging the brake pedal into the hook. The first and second shafts are locked together to maintain a selected separation of the wedge member from the lower end of the first shaft and the vehicle body preventing depression of the brake pedal. The wedge is pivotable into and out from alignment with the hook.

7 Claims, 3 Drawing Sheets

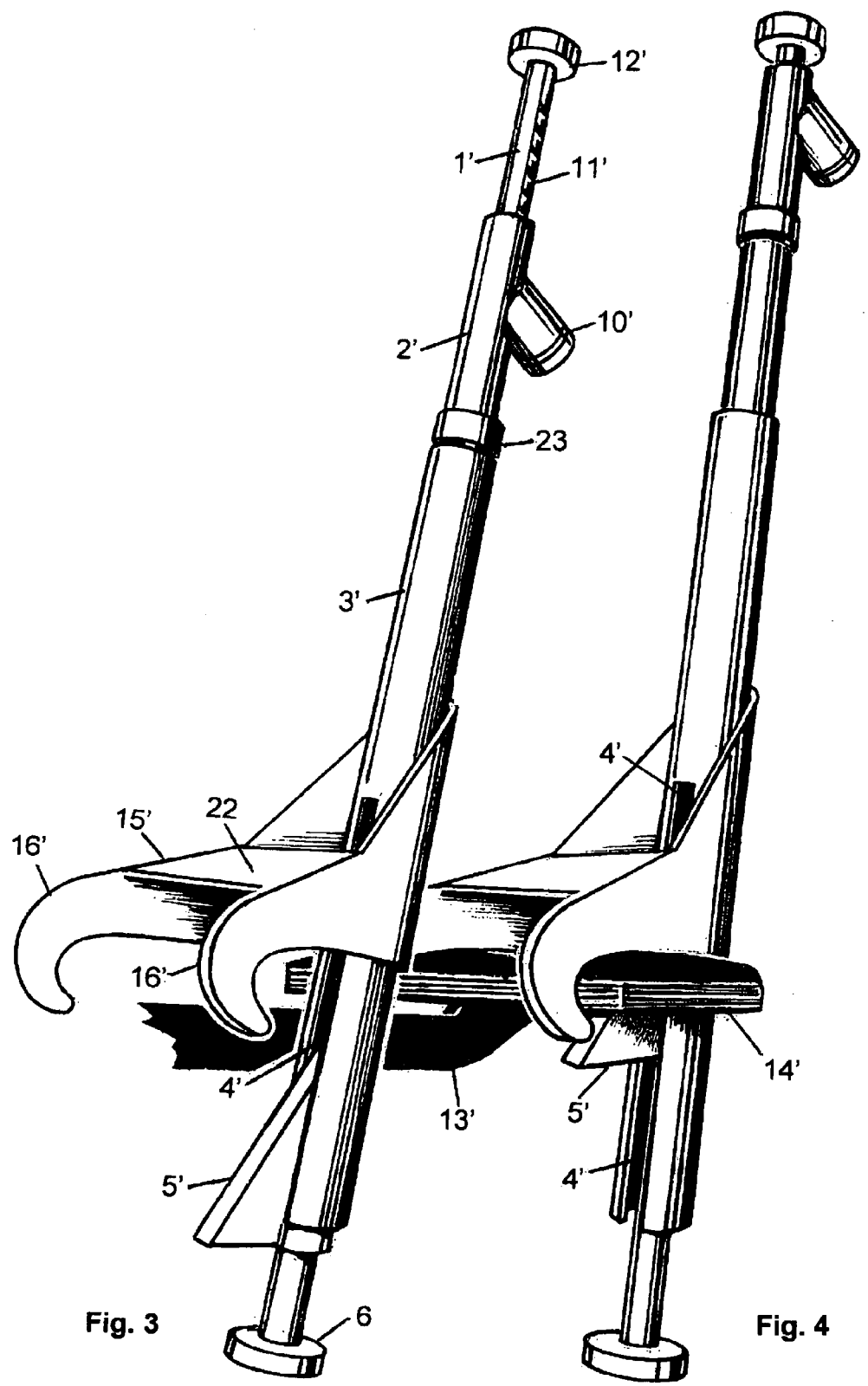

UNIVERSAL PORTABLE BRAKE PEDAL LOCKING DEVICE FOR VEHICLES

RELATED APPLICATION

Priority is claimed from Provisional Application No. 60/391017, filed Jun. 25, 2002, the disclosure of which is incorporated herein by reference.

FIELD OF THE INVENTION

The invention relates to a universal, portable brake pedal locking device for motor vehicles.

BACKGROUND OF THE INVENTION

Numerous anti-theft, portable brake pedal locking devices for motor vehicles have been proposed over many years.

A number of such locking devices have relied on anchoring the pedal to the steering wheel. A well known and widely used portable device of the prior art is sold under the Registered Trademark CLUB comprises first and second hook jaw members having respective shaft members linked by telescopic assembly for clamping engagement of the jaws behind a brake pedal shaft and over the rim of the steering wheel, respectively to clamp the pedal in the raised, disengaged position to the steering wheel. Another approach taught by U.S. Pat. No. 5,267,258 issued 1993 to Heh maintains the brake pedal in a depressed, fully engaged position.

However, the unreinforced rim of the steering wheel is exposed and may be sawn through or otherwise severed relatively easily by a thief, permitting release of the upper hook member from the rim, enabling the car to be driven away.

Other approaches taught by U.S. Pat. No. 5,870,912 issued Feb. 16, 1999 to Vito and by U.S. Pat. No. 5,715,710 issued 1998 to De Lucia comprise first and second shafts which can be adjusted axially to engage the floor as a stand off and under the brake pedal shaft, respectively, and then locked together to prevent depression of the brake pedal. In a further proposal taught in U.S. Pat. No. 5,537,846 issued 1996 by to Simon the first and second axially adjustable shafts carry clamping plates which engage together over and under the brake pedal itself by manually tightening a screw for firm clasping.

However, the size, shape and separation of brake pedals from the vehicle floor can vary for different vehicles and the requirement for screw adjustment both for installation on and removal from the brake pedal locking step can be relatively time consuming and inconvenient, a factor which can significantly reduce use of the locking device.

SUMMARY OF THE INVENTION

It is an object of the invention, to provide a portable anti-theft device for a vehicle which has the advantages of universal application and easy transfer between conventional vehicles of different types, when required, is relatively simple and easy to install, and yet which is secure in operation, in particular not requiring reliance on the strength of vulnerable and exposed parts of the vehicle such as the rim of the steering wheel which may be severed, while leaving the vehicle in drivable condition.

According to the invention, a portable universal anti-theft device for immobilizing a brake pedal of a motor vehicle comprises:

a first shaft member having a lower end;

a second shaft member comprising a sleeve mounted for relative coaxial sliding movement on the first shaft member and having a lower jaw member comprising a wedging member extending transversely from a bottom end thereof; and, a third shaft member comprising a sleeve mounted for coaxial sliding movement on the second shaft member with an upper jaw member extending transversely from a location adjacent a lower end thereof provided with at least one grappling hook extending downwards from a free end thereof;

the second shaft member being rotatable relative to the third shaft member, whereby the upper jaw member can be engaged over the brake pedal with the grappling hook extending around and under an upper edge portion of the brake pedal in grasping relation and the second shaft member then raised axially relative to the third shaft member with one hand to bring the wedging member into engagement with an underside of a lower edge portion of the brake pedal opposite the upper edge portion to wedge the brake pedal immovably in the upper jaw member and the first shaft member lowered by the other hand so that the lower end provides a stand-off engaging the vehicle floor;

means on the third shaft member for preventing rotation of the wedge member relative to the third shaft member when the wedge member is raised axially relative to the second shaft member into brake pedal clamping engagement and means for locking the first and second shaft members together against relative axial movement to maintain a selected separation of the wedge member in the brake pedal clamping engagement from the lower end of the first member and the vehicle floor thereby to prevent depression of the brake pedal.

The provision of the lower jaw as a wedge member which can be progressively engaged with the brake pedal by a simple upward motion obviates the time consuming procedure of screw tightening.

In one embodiment the upper jaw member is spaced above the lower end of the third shaft member and the rotation preventing means comprises a wedge member receiving slot extending axially up the third shaft member from the lower end. The rotation preventing means may also comprise a wedge member receiving aperture provided in an underside of the upper jaw member.

In a preferred construction, a wall portion of the third shaft below the upper jaw member is rebated through 90 degrees end and the wedge member is located in the rebated portion to permit relative rotation of the wedge member from a position extending perpendicular to the upper jaw member and grappling hook prior to installation on the brake pedal to a position aligned with the upper jaw member and grappling hook in the brake pedal engaging position and the rotation preventing means comprises a wedge receiving slot extending axially upward from one edge portion of the rebate aligned with the upper jaw member and grappling hook for receiving at least a leading end of the wedge member as a sliding fit so that opposed walls of the slot prevent rotation of the wedge member in a brake pedal clamping position.

This provides additional clearance for ease of installation on the brake pedal.

A particular advantage arising from immobilizing the brake pedal in the up or "off" position is that, with most modern automatic gearboxes, shift into a drive gear is prevented without depression of the brake pedal.

The progressive wedging action enables installation on differently sized brake pedals (within limits) providing a universal anti-theft device.

BRIEF DESCRIPTION OF THE DRAWINGS

Specific embodiments of the invention will now be described by way of example only with reference to the accompanying drawings in which:

FIG. 3 is a perspective view of a second embodiment of the invention prior to installation; and FIG. 4 is a similar view to FIG. 2, after installation on the brake pedal assembly.

DESCRIPTION OF PARTICULAR EMBODIMENTS

Figure 1:
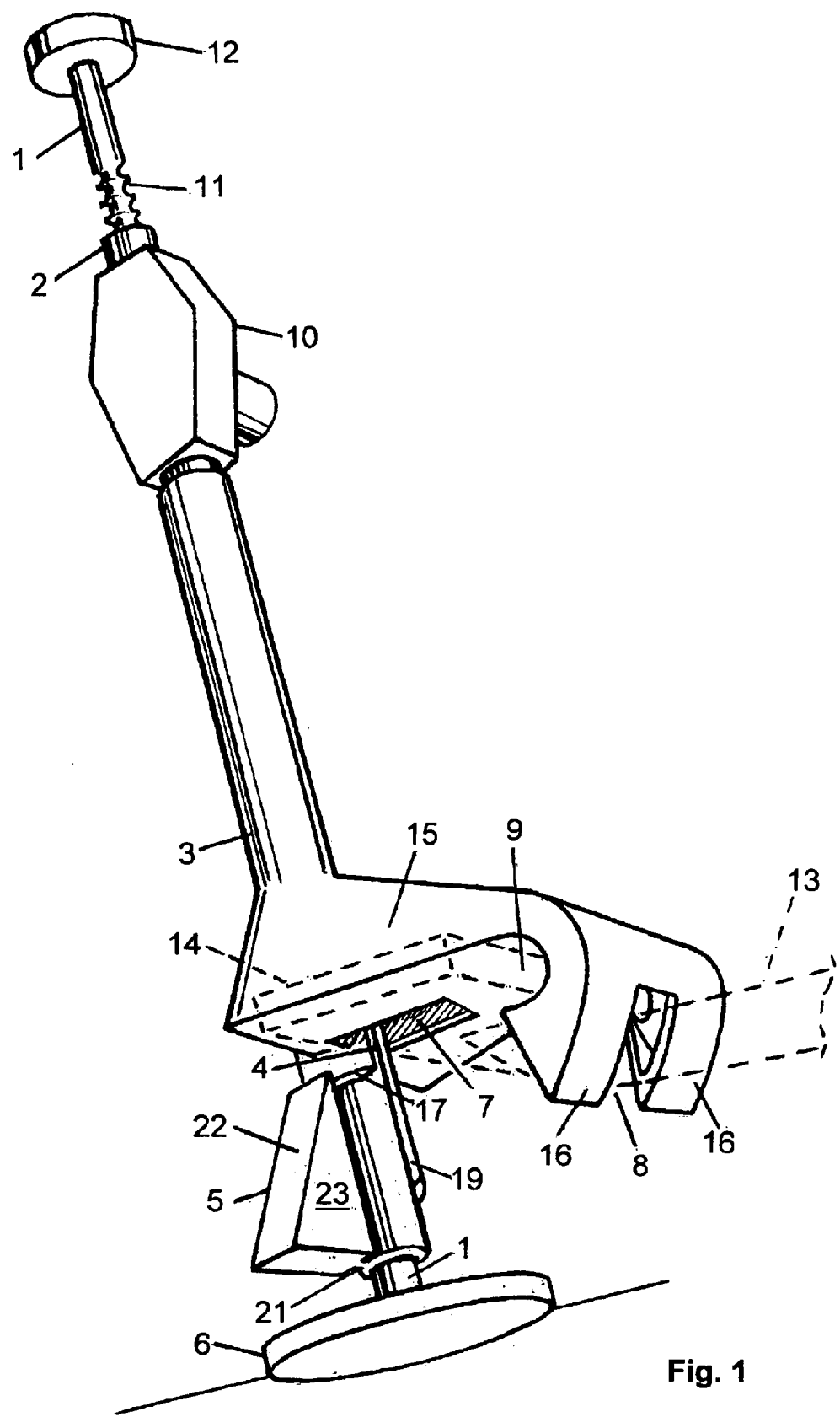
FIG. 1 is a perspective view of a first embodiment of the invention prior to installation with the location of a brake pedal assembly indicated in broken lines.
Figure 2:
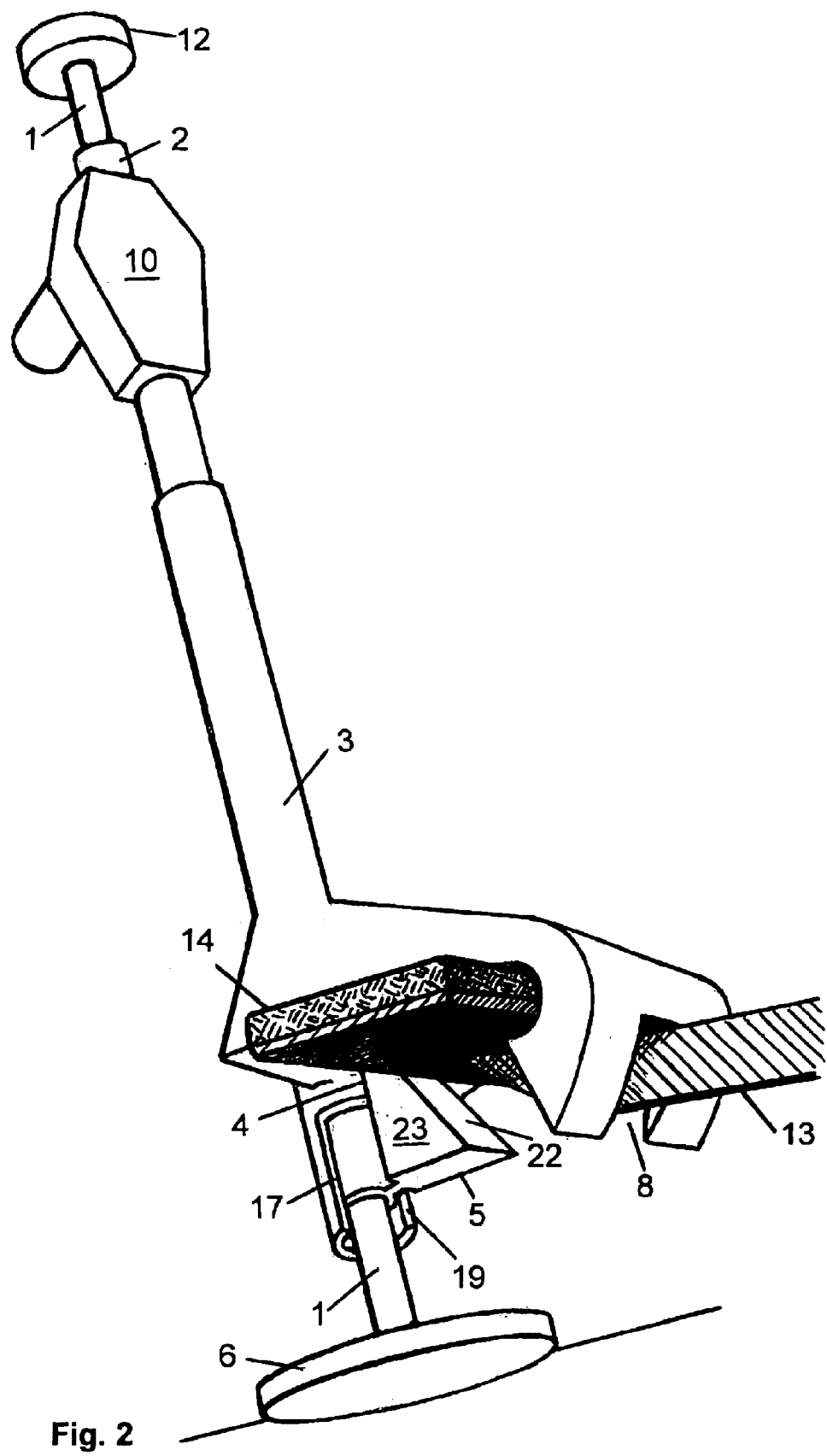
FIG. 2 is a similar view to FIG. 1 after installation on the brake pedal assembly.

As shown in FIGS. 1 and 2, the first embodiment of universal brake pedal locking device comprises first, second and third metal shaft members 1, 2 and 3 assembled together in axially sliding, coaxial relation by the second shaft member 3 forming a coaxial sleeve on the first shaft member 1 and the third shaft member 3 forming a sleeve on the second shaft member 2. The second shaft member 2 can rotate between the first and third shaft members 1 and 3, respectively.

The first shaft member 1 has a disc form foot or pad 6 at a bottom end for stabilizing the device on the vehicle floor, a series of circumferential locking grooves or serrations 11 adjacent a top end and a top disc-form handle 12.

The second shaft member 2 has a triangular, brake pedal wedging member 5 machined on or welded to a bottom end so as to protrude radially therefrom with an entry or leading end uppermost and key operated locking hardware 10 at an upper end for locking engagement with the locking grooves 11 to lock the first and second shafts together against relative axial movement.

The third shaft 3 has a lug or appendage 15 extending radially from a location, adjacent but spaced upwardly from a bottom end of the shaft and having a bifurcated, hook-form outer free end. The appendage provides an upper brake pedal clamping jaw with individual grappling hook members 16 extending spaced apart on either side thereof around and under an upper edge of the brake pedal 14. The underside of the appendage is formed with a rectangular opening 7 for receiving the upper end or apex of the triangular wedging member 5 in the pedal clamping/engaging position. The wall of the third shaft is formed with a cut out or rebate 17 extending through 90 degrees at the bottom end to permit rotation of the wedging member 5, during installation on the brake pedal, through 90 degrees from a position extending perpendicular to the appendage to a position aligned with a brake pedal shaft receiving clevis 8 defined between the jaws. The cut out or rebate continues upward from one edge portion 19 as an axial wedge receiving slot 4 for receiving the apex of the wedge member as a sliding fit so that opposed walls of the slot preventing rotation of the wedge member thereof in the final pedal clamping position.

To install the locking device on a brake pedal, with the device positioned as shown in FIG. 1 in which the foot 6 is fully withdrawn, in uppermost position, and the wedge member 5 extends at 90 degrees to the appendage clevis 8, the hooks of the appendage are hooked over and behind the upper edge portion of the brake pedal with the brake pedal shaft received in the clevis. The wedge member is then rotated through 90 degrees by rotating the second shaft 2 under the opposite edge portion of the brake pedal pad 14, by manually gripping the lock, for example, until the wedge member abuts an opposite wall 19 of the cut out and is aligned with the slot 4 in the second member and with the clevis and pulled upward drawing the wedge member into and along the slot 4 wedging the pedal firmly in the hooks. (The third shaft is prevented from rising with the second shaft during such operation by engagement of the hook members behind/under the pedal which cannot be further raised). While the lock mechanism is held up, the handle 12 is pushed down by the other hand to seat the foot firmly against the vehicle floor and the lock 10 operated to prevent relative axial movement of the first and second shafts 1 and 2, respectively. The wedge member is necked at its junction 21 with the second shaft so that rotation is prevented by engagement of the necked portion with opposite edge portions of the slot 4 and by engagement of the opposite faces of the wedging surface 22 of the unnecked or head portion 23 with the opposite sides of the aperture 7.

When unlocked, the wedge will simply fall out of the aperture 7 under gravity and slot 4 under gravity permitting easy rotation thereof in an opposite direction out of alignment with the hook members 16 enabling them to be easily released from the brake pedal.

The lock can be provided with a ratchet mechanism maintaining the foot 6 in the lowermost position before locking, preventing inadvertent retraction of the foot during the locking step.

In an alternative version shown in FIGS. 3 and 4 in which primed reference numerals are used to indicate similar or modified parts, the appendage 15' comprises a pair of plate-like hook members 16' attached by welding to extend from opposite sides of the third shaft 3' and braced by a bridging plate 22. The wedge trapping slot 4' extends through the bottom end of the third shaft member 2' and the downward axial movement of the second shaft member relative to the third shaft is restricted by a collar 23 on the second shaft 2' so that the wedge member 5' always remains in the slot with no relative rotation of the wedge member 5' being possible.

I claim:

1. A portable universal anti-theft device for immobilizing a brake pedal of a motor vehicle comprising:

a first shaft member, a second shaft member and a third shaft member assembled side by side for relative axial movement, the first shaft member having a bottom end for providing a stand-off for engaging a vehicle floor/fire wall;

the second shaft member and the third shaft member having, respectively upper and lower clamping jaws extending transversely therefrom, one clamping jaw comprising a hook member and another clamping jaw comprising a wedge member whereby relative axial movement of the second and third shaft members brings the jaws together about a brake pedal interposed therebetween with the wedge member urging the brake pedal into the hook; and, means for locking the first and second shaft members together against relative axial movement to maintain a selected separation of the wedge member in brake pedal clamping engagement from the lower end of the first member and the vehicle floor thereby to prevent depression of the brake pedal.

2. A portable universal anti-theft device for immobilizing a brake pedal of a motor vehicle comprising:

a first shaft member having a lower end;

a second shaft member comprising a sleeve mounted for relative coaxial sliding movement on the first shaft member and having a lower jaw member comprising a wedging member extending transversely from a bottom end thereof; and, a third shaft member comprising a sleeve mounted for coaxial sliding movement on the second shaft member with an upper jaw member extending transversely from a location adjacent a lower end thereof provided with at least one grappling hook extending downwards from a free end thereof;

the second shaft member being rotatable relative to the third shaft member, whereby the upper jaw member can be engaged over the brake pedal with the grappling hook extending around and under an upper edge portion of the brake pedal in grasping relation and the second shaft member then raised axially relative to the third shaft member with one hand to bring the wedging member into engagement with an underside of a lower edge portion of the brake pedal opposite the upper edge portion to wedge the brake pedal immovably in the upper jaw member and the first shaft member lowered by the other hand so that the lower end provides a stand-off engaging the vehicle floor;

means on the third shaft member for preventing rotation of the wedge member relative to the third shaft member when the wedge member is raised axially relative to the third shaft member into brake pedal clamping engagement;

and means for locking the first and second shaft members together against relative axial movement to maintain a selected separation of the wedge member in the brake pedal clamping engagement from the lower end of the first member and the vehicle floor thereby to prevent depression of the brake pedal.

3. A device according to claim 2 wherein the upper jaw member is spaced above the lower end of the third shaft member and the rotation preventing means comprises a wedge member receiving slot extending axially up the third shaft member from the lower end.

4. A device according to claim 2 wherein the rotation preventing means comprises a wedge member receiving aperture provided in an underside of the upper jaw member.

5. A device according to claim 2 wherein a wall portion of the third shaft below the upper jaw member is rebated through 90 degrees end and the wedge member is located in the rebated portion to permit relative rotation of the wedge member from a position extending perpendicular to the upper jaw member and grappling hook prior to installation on the brake pedal to a position aligned with the upper jaw member and grappling hook in the brake pedal engaging position and the rotation preventing means comprises a wedge receiving slot extending axially upward from one edge portion of the rebate aligned with the upper jaw member and grappling hook for receiving at least a leading end of the wedge member as a sliding fit so that opposed walls of the slot prevent rotation of the wedge member in a brake pedal clamping position.

6. A device according to claim 2 wherein the upper jaw member has another grappling hook member extending downwardly from a free end and spaced transversely from said at least one grappling hook so as to provide a brake pedal shaft receiving slot between them and to engage the brake pedal on respective opposite transverse sides of the slot.

7. A device according to claim 4 wherein the grappling hooks are bridged by a bracing member.

* * * * *